(12) United States Patent
Lindemann et al.

(10) Patent No.: US 8,750,416 B2
(45) Date of Patent: Jun. 10, 2014

(54) COMPENSATING FOR A RADIO FREQUENCY AMPLIFIER

(75) Inventors: Brian Lindemann, Quincy, IL (US); Doug Foote, Quincy, IL (US); Dan Prysby, Quincy, IL (US); John Ribe, Quincy, IL (US); David Kroeger, Quincy, IL (US)

(73) Assignee: Broadcast Electronics, Quincy, IL (US)

( * ) Notice: Subject to any disclaimer, the term of this patent is extended or adjusted under 35 U.S.C. 154(b) by 86 days.

(21) Appl. No.: 13/441,497

(22) Filed: Apr. 6, 2012

(65) Prior Publication Data

US 2012/0281786 A1  Nov. 8, 2012

Related U.S. Application Data

(60) Provisional application No. 61/473,751, filed on Apr. 9, 2011.

(51) Int. Cl.
*H04L 25/49* (2006.01)
(52) U.S. Cl.
USPC ........... 375/297; 375/219; 375/221; 375/295; 455/114.3; 455/127.1; 455/127.2; 455/127.3; 330/75; 330/149

(58) Field of Classification Search
USPC .............. 375/219, 221, 295, 297; 455/114.3, 455/127.1, 127.2, 127.3; 330/75, 149
See application file for complete search history.

(56) References Cited

U.S. PATENT DOCUMENTS

| 6,985,033 B1 * | 1/2006 | Shirali et al. .................. 330/149 |
| 2008/0265996 A1 * | 10/2008 | Kim et al. ...................... 330/291 |
| 2010/0109771 A1 * | 5/2010 | Baik et al. ...................... 330/149 |

OTHER PUBLICATIONS

Unique Broadband Systems, Ltd., Universal Adaptive Pre-corrector Model UAP-2011 Data Sheet, Jun. 7, 2011, http://www.uniquesys.com/DVB/DVB_adaptive-precorrector/UAP-2011-56439-01-S07.pdf, Retrieved on May 11, 2012.

* cited by examiner

*Primary Examiner* — Leon Flores
(74) *Attorney, Agent, or Firm* — Brevetto Law Group

(57) ABSTRACT

An analog radio frequency input and an analog feedback from an output of a radio frequency amplifier are digitized and down-converted. Pre-distortion coefficients are calculated based on the down-converted input and down-converted feedback and the down-converted input is filtered using the pre-distortion coefficients. The filter output is then up-converted to a carrier frequency and converted to analog to be provided to the radio frequency amplifier.

17 Claims, 3 Drawing Sheets

US 8,750,416 B2

COMPENSATING FOR A RADIO FREQUENCY AMPLIFIER

CROSS-REFERENCE TO RELATED APPLICATIONS

This application claims the benefit of and priority to U.S. Provisional Application 61/473,751 filed Apr. 9, 2011 which is incorporated herein by reference in its entirety.

BACKGROUND

1. Technical Field

The present subject matter relates to radio transmission, and more specifically, to compensating for a power amplifier used for radio transmission.

2. Description of Related Art

As digital radio modulation schemes have been developed, such as HD-Radio™ from iBiquity™ and Digital Radio Mondiale™ (DRM), among others, a greater demand has been placed on transmitters, because with even a small amount of distortion in the gain of the power amplifier, multi-carrier inputs will cause high out-of-band spurious signals and harmonics to appear in the spectrum. Orthogonal Frequency Division Modulation (OFDM) also causes the peak RF power can be quite high compared to the nominal average power.

Traditionally, effects of distortion due to gain compression have been offset via the use of piece-wise linear approximations of the inverse of the gain compression applied to the base-band signal as a pre-distortion. The net result of the system appears linear. This was done in the analog realm and diodes were used to generate the power transition points on the gain curve for the pre-distortion. Recently, application of digital pre-distortion applied to the base-band signal has become the norm using fixed tables within the modulator.

To counteract the effects of high peak-to-average power levels, various methods have been utilized making use of the actual phase modulation of the OFDM carriers in such a way to minimize the peaks. Others have made use of various methods of re-modulating the individual symbols contained within the OFDM signal to make the total peak power less than a nominal value. These methods require detailed knowledge of the actual transmitted signal. And in the case of analog frequency modulation (FM) and digital modulation in the same broadcast, requires knowledge of the FM carrier being sent as well.

SUMMARY

In a method to pre-compensate an input to a radio frequency amplifier, an analog radio frequency input and an analog feedback from an output of a radio frequency amplifier are digitized and down-converted. Pre-distortion coefficients are calculated based on the down-converted input and down-converted feedback and the down-converted input is filtered using the pre-distortion coefficients. The filter output is then up-converted to a carrier frequency and converted to analog to be provided to the radio frequency amplifier.

A compensation apparatus includes a first analog to digital converter to digitize an analog radio frequency input and a second analog to digital converter to digitize an analog feedback from an output of a radio frequency amplifier. One or more processors are included to calculate pre-distortion coefficients based on the input and feedback, and apply a digital pre-distortion filter to the input using the pre-distortion coefficients. A digital to analog converter is coupled between the one or more processors and the radio frequency amplifier.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. They should not, however, be taken to limit the invention to the specific embodiment(s) described, but are for explanation and understanding only. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Reference now is made in detail to the examples illustrated in the accompanying drawings and discussed below.

Figure 1:
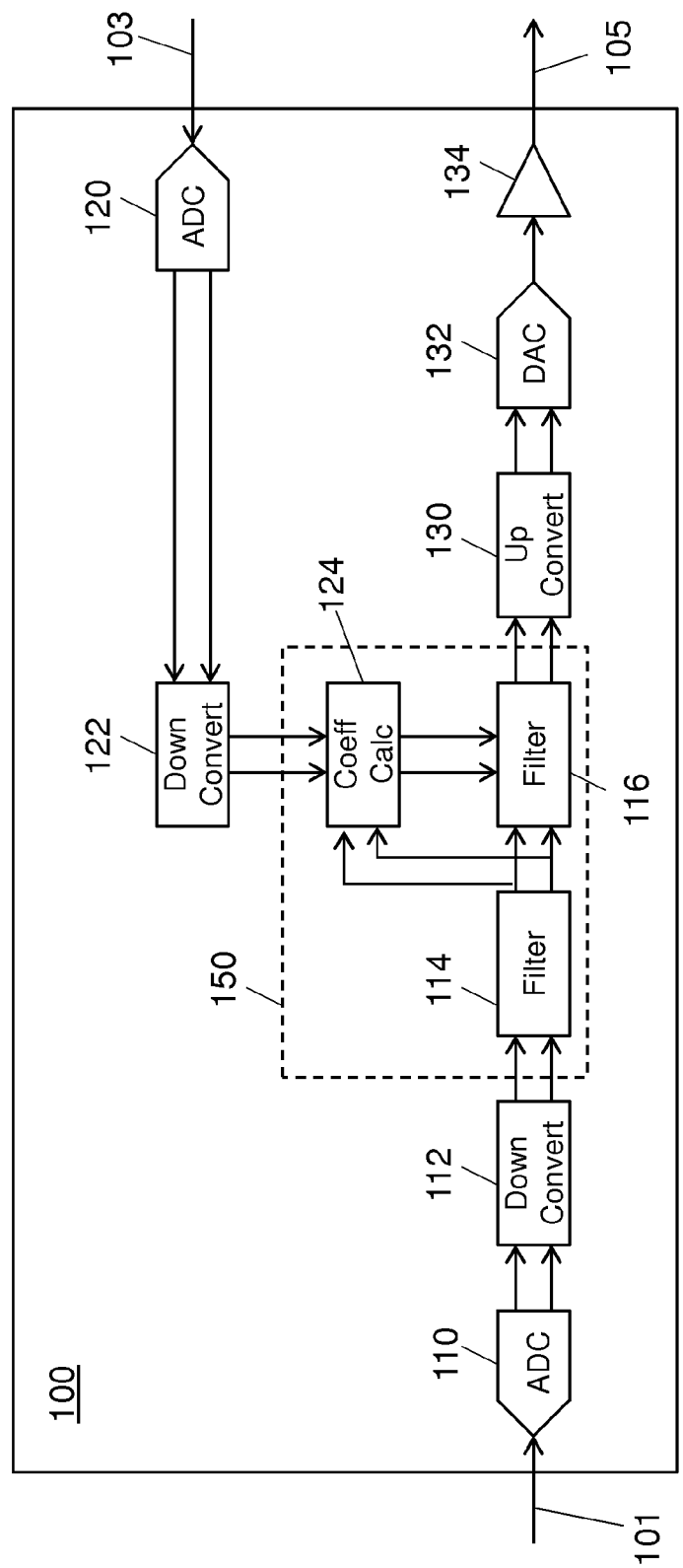
FIG. 1 shows a block diagram of an embodiment of a compensation apparatus.

FIG. 1 shows a block diagram of an embodiment of a compensation apparatus 100. The compensation apparatus 100 may be useful to compensate an input to a radio frequency (RF) amplifier to counteract non-linear responses of the amplifier, such as an RF power amplifier that may be used for broadcast applications. The compensation apparatus 100 may include various components, subassemblies, circuit boards, or other parts that may be coupled using any combination of wires, traces on printed circuit boards, transmission lines, or any other coupling mechanisms.

The compensation apparatus 100 makes use of analog feedback 103 from the output of the power amplifier. This feedback 103 is converted to baseband and compared to the original input 100 and the coefficients for the pre-distortion are calculated dynamically during operation of the compensation apparatus 100, rather than being based on a static table of coefficients. In past systems, compensation may have been done within the modulator. The compensation apparatus 100 uses broad-band adaptive pre-distortion, and also applies a method of peak reduction which does not rely on a-priori knowledge of the symbols being transmitted. Compensating the RF input may reduce the peak-to-average ratio of the signal, and distort the signal if it is at a low level in a manner that counteracts the effects of non-linearities in the RF power amplifier stage. The power amplifier may operate in a more efficient manner due to the lowered peak power that it must handle, and may result in a reduction of the amount of headroom needed for the power amplifier allowing a lower peak power amplifier to be used.

The compensation apparatus 100 includes an input 101 to receive a signal having a carrier that has been modulated to carry analog and/or digital information. The carrier frequency may be any radio frequency but in some embodiments, the carrier frequency may be the medium frequency band (MF—300 kilo-hertz to 3 mega-hertz), such as in a range of 535 kilo-hertz (kHz) to 1605 kHz, which may commonly be used for amplitude modulation (AM) radio broadcasts. In other embodiments the carrier frequency may be in the very high frequency band (VHF—30 mega-hertz to 300 mega-hertz) or the ultra-high frequency band (UHF—300 MHz to 3000 MHz). In some embodiments having a carrier frequency in the VHF band, the center frequency of the carrier may be in a range of 65 mega-hertz (MHz) to 110 MHz and signal received at the input 101 is frequency modulated (FM) with analog audio, such as may be found in FM broadcasts of different countries of the world.

In some embodiments having a carrier frequency in the VHF band, the center frequency of the carrier may be in a range of 86.5 MHz to 108 MHz and input 101 is modulated to carry digital data using orthogonal frequency-division multiplexing (OFDM) or coded orthogonal frequency-division multiplexing (COFDM), such as may be found in digital FM broadcasts of different countries of the world. In some embodiments, the input 101 may be modulated with both analog and digital data.

In some embodiments having a carrier frequency in the VHF or UHF bands, the carrier frequency of the analog output has a center frequency in a range of 40 mega-hertz (MHz) to 1000 MHz and the input 101 carries digital data modulated using vestigial side-band (VSB) modulation or coded orthogonal frequency-division multiplexing (COFDM) such as may be found in terrestrial television broadcasts of different countries of the world. Other embodiments may accept an input signal having any carrier frequency and any analog or digital modulation.

The input 101 is coupled to an analog to digital converter (ADC) 110 which digitizes the modulated carrier received at the input 101. The parameters of the ADC 110 may vary between embodiments, but the ADC 110 may sample the modulated carrier at a rate high enough, and with enough resolution, to allow the calculations in later stages to perform adequately. In some embodiments the ADC 110 may create complex samples including data for both quadrature (Q) and in-phase (I). Various ADC components may be used but in at least one embodiment, a Texas Instruments ADS5560 ADC may be used to provide 16 bits per sample for the quadrature and in-phase samples. In some embodiments, the ADC 100 may sample the input at a rate that is below the Nyquist rate for the carrier, but at a rate more than twice as fast as the symbol rate of the digital data modulated on the carrier. In some embodiments, the sample rate may be at least 10 times as fast as the symbol rate and in at least one embodiment targeting HD-Radio transmission, the ADC 110 may sample the input 101 at 29.7675 mega-samples per second, which is 40 times faster than the 744,187.5 symbols per second that are provided by an HD-Radio transmission (also known as in-band, on-channel, or IBOC, transmission). Sampling below the Nyquist rate for the carrier may result in an aliasing of the carrier in the sampled data. The aliased frequency may then be transformed by subjecting the data to a complex frequency transform. The up-sampled digitally modulated portion of the input 101 may be added with the analog FM portion of the input 101 to produce a complex baseband data stream.

The output of the ADC 110 may be coupled to the down-converter 112. The down-converter may effectively remove the carrier to bring the modulated data to a baseband frequency. Any method may be used to down-convert the output of the ADC 110 including, but not limited to, decimation. The down-converter may be implemented in hardware as a part of a special purpose circuit, in a field-programmable gate array (FPGA), or in firmware running on one or more processors 150, such as a digital signal processor (DSP). In some embodiments the down-converter 112 may be implemented as a combination of hardware and firmware.

The compensation apparatus also includes a feedback input 103 that is coupled to the output of the RF power amplifier being compensated for. The output of the RF power amplifier may be attenuated so that the input 103 is at a low level, such as about 100 milli-Watt (mW) or less than about 3.6 volts peak-to-peak, that can effectively be sampled by the ADC 120. The ADC 120 may be identical to the ADC 110 in some embodiments but other embodiments may use different parameters for the ADC 120. For example, in one embodiment, the ADC 120 may generate complex 14 bit samples. Although some embodiments may use different sample rates for the ADC 110 and ADC 120, some embodiments may use the same sample rate and some may use synchronized sample clocks to provide a one-to-one correspondence between the samples generated by the ADC 110 and the samples generated by the ADC 120.

The output of the ADC 120 may be coupled to the down-converter 122. The down-converter 122 may be similar to the down-converter 112 or may be implemented differently than the down-converter 112, but may perform a similar function of removing the carrier from the feedback to bring the modulated data to a baseband frequency.

Some embodiments of the compensation apparatus 100 may include one or more processors 150 to implement one or more functions of the compensation. In some embodiments the one or more processors may include one or more digital signal processors (DSPs). The one or more processors 150 may also be used to implement the down-converters 112, 122 along with calculating the coefficients 124 and the filtering 114, 116. Some embodiments may use the one or more processors 150 to implement the up-converter 130 as well. The one or more processors 150 may include non-volatile storage such as flash memory or one-time programmable read only memory (ROM), and random access memory (RAM) that may be used for storing programs and/or data. The non-volatile storage and/or RAM may be included in the same package as the one or more processors or may be separate chips. In some embodiments, other storage may also be included such as a hard disk drive or optical drive that may be used to store programs or data. Some embodiments may also include a network interface, a display interface, and/or an interface for human input devices such as a keyboard and/or mouse that may be useful for configuring and/or controlling the compensation apparatus.

The one or more processors 150 may include instructions to apply a filter 114 to the output of the down-converter 112. The filter 114 may be a smoothing filter, or a crest-factor reducer, to reduce the peaks of the output of the down-converter. The coefficients of the filter 114 may be static and may not change in response to changes at the input 101 and/or feedback input 103. The coefficients of the filter 114 may be selected so that the filter 114 may not adversely affect modulation of symbols in the down-converted input. The crest factor reduction coefficients may be selected based an expected carrier modulation technology. This may be done because the peak to average ratio magnitude of each modulation technology may vary. In some embodiments, multiple sets of coefficients for the filter 114 may be stored in the compensation apparatus. The set of coefficients to be used for the filter 114 may be selected during installation or configuration of the compensation apparatus 100, depending on the application. The root mean squared (RMS) voltage level of the input 101, or at a point in the digital stream such as after the ADC 110 or after the down-converter 112, may be measured and adjusted to provide a consistent RMS level to the one-or more processors 150.

The one or more processors 150 may include a coefficient calculator 124 to calculate the coefficients to be used on the compensation filter 116 based on the input 101 and the feedback 103. The down-converted feedback from the down-converter 122 may be compared to the down-converted input from the down-converter 112 or the output of filter 114, depending on the embodiment, by the coefficient calculator 124. The coefficient calculator 124 may correlate the feedback 103 with the input 101 to compensate for the phase delay of the compensation apparatus 100 and the radio frequency amplifier. The coefficient calculator 124 may also correlate power levels of the feedback 103 and input 101. The coefficients may be dynamically calculated to compensate for the non-linear response of the radio frequency amplifier.

A compensation filter 116 may be implemented in the one or more processors 150 to compensate for the radio frequency amplifier. The filter 116 may use the coefficients generated by the coefficient calculator 124 to filter the output of the smoothing filter 114. The filter 116 may be a Kaiser window filter in some embodiments and in at least one embodiment may use 249 complex symmetric cancellation coefficients generated by the coefficient calculator 124. The output of the filter 116 may then be up-converted to a carrier frequency that may be the same or different than the carrier frequency of the input 101 by the up-converter 130. The up-converter 130 may be a separate circuit or may be implemented by the one or more processors 150 or in the digital to analog converter (DAC) 132. The output of the up-converter 130 may be converted to analog by the DAC 132. The output of the DAC 132 may be sent to a pre-amplifier 134 to set the output level of the output 105 to that expected by the radio frequency amplifier. The pre-amplifier 134 may also have an output impedance to match the input impedance of the RF amplifier.

Figure 2:
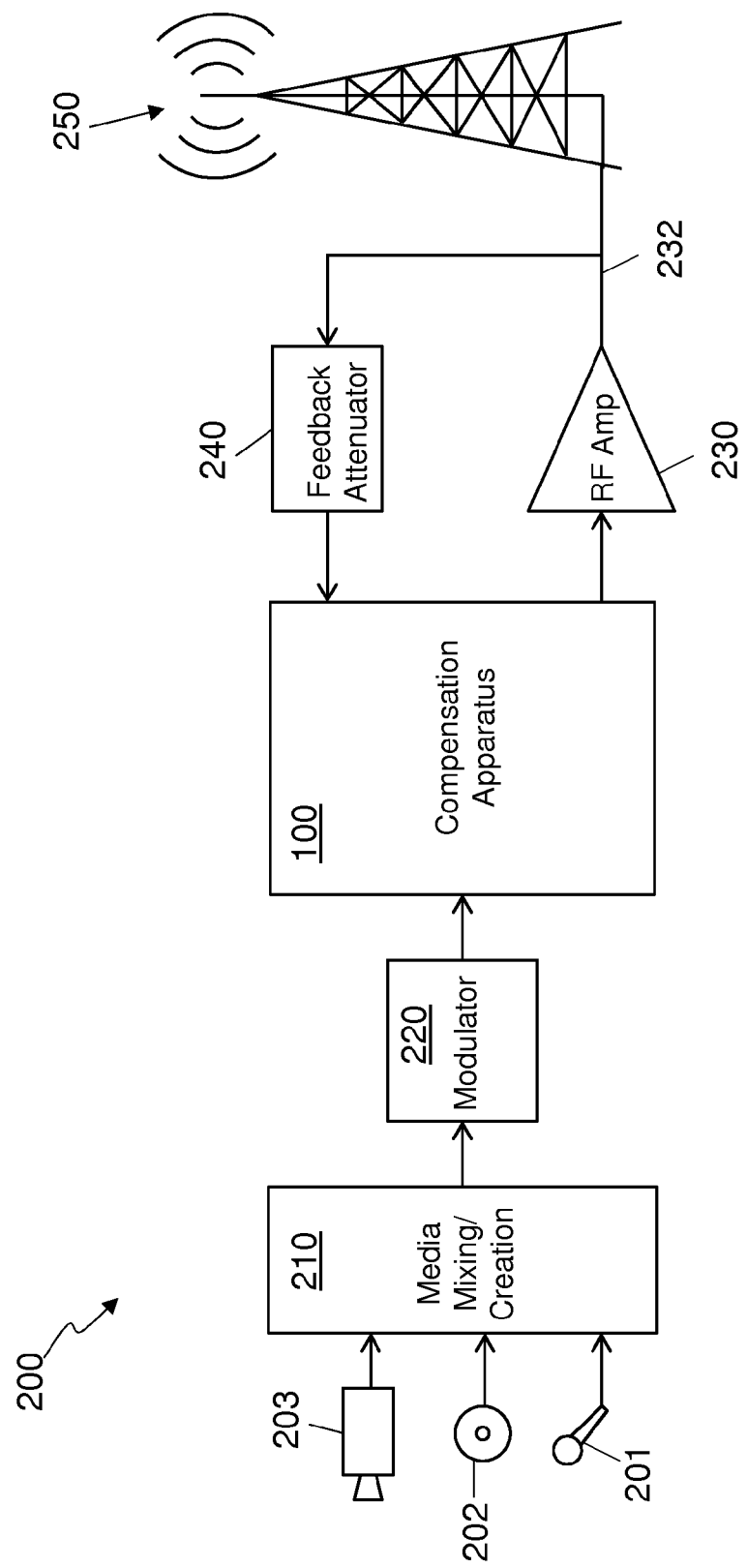
FIG. 2 shows a block diagram of a broadcast system using an embodiment of a compensation apparatus.

FIG. 2 shows a block diagram of a broadcast system 200 using an embodiment of a compensation apparatus 100. One or more media sources, such as a microphone 201, an optical disc 202, a video camera 203, or any other media source, may provide inputs to a media mixing/creation platform 210. The media mixing/creation platform 210 may create a media output that includes one or more channels of audio, one or more streams of video, metadata related to the audio and/or video, and/or other data. The output of the media mixing/creation platform 210 may be analog and/or digital data, depending on the embodiment, and may be sent to a modulator 220. The modulator 220 may modulate the media/data received from the media mixing/creation platform 210 on a carrier and output the modulated analog carrier. The carrier may be modulated with either digital data, analog information, or both, depending on the embodiment. The output of the modulator 220 may be coupled to the compensation apparatus 100, such as described in FIG. 1, although other embodiments of the compensation apparatus may be used.

An analog output of the compensation apparatus 110 may be coupled to the RF power amplifier 230 and the output 232 of the RF power amplifier coupled to an antenna 250 to broadcast the media from the media mixing/creation platform 210. The output 232 may also be coupled to a feedback attenuator 240 to reduce the power level of the output 232. The output of the feedback attenuator 240 may be provided as feedback to the compensation apparatus 100.

By coupling the compensation apparatus 100 between the modulator 220 and the RF power amplifier 230, and providing an analog input and output, the compensation apparatus 100 may be used to retrofit existing broadcast systems. The modulator 220 and the RF power amplifier 230 may be able to support the compensation apparatus 100 without modification.

Figure 3:
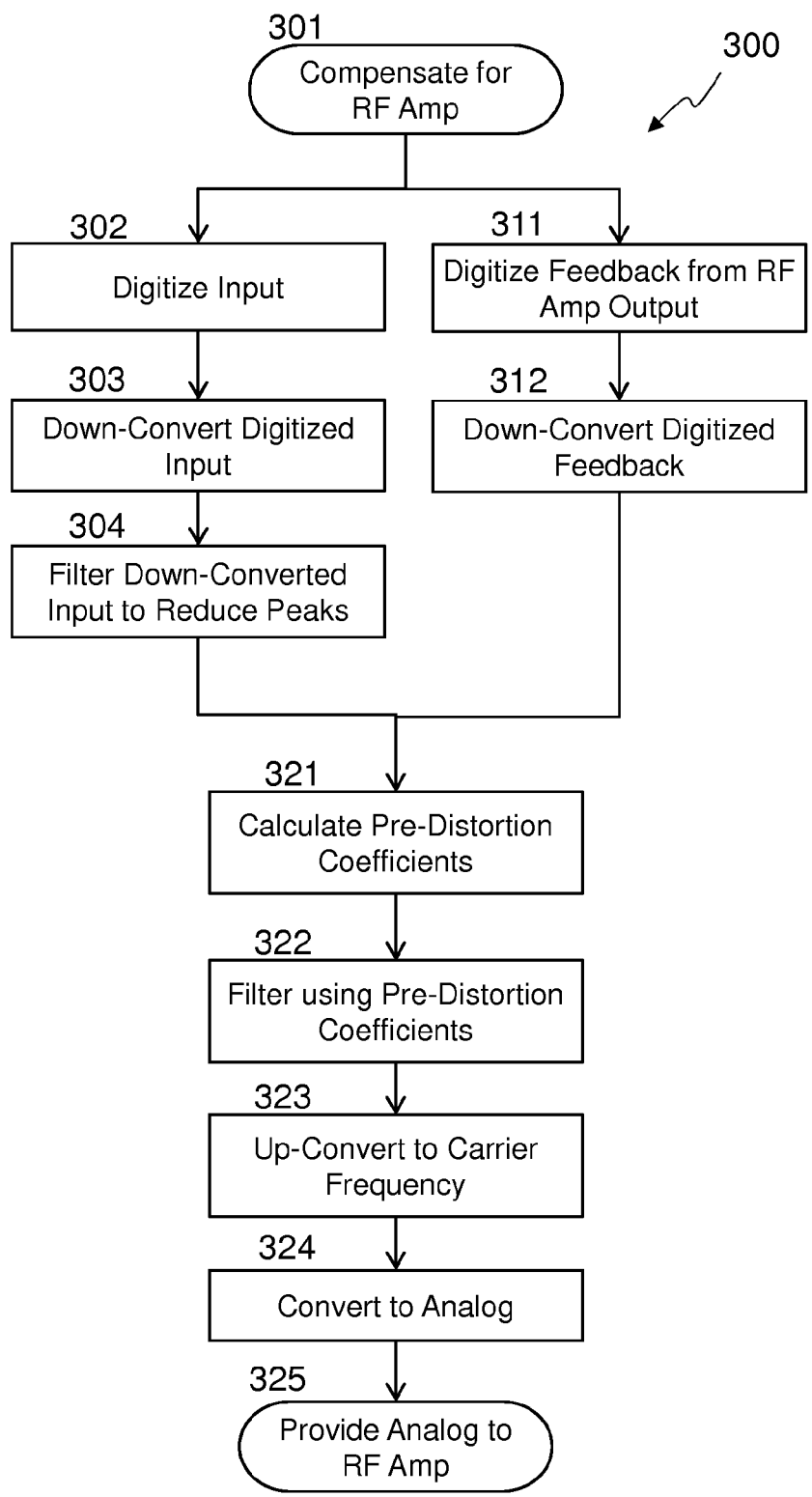
FIG. 3 is a flow chart of an embodiment of method to pre-compensate an input to a radio frequency amplifier.

FIG. 3 is a flow chart 300 of an embodiment of method to compensate an input to a radio frequency amplifier. The flow chart 300 starts at block 301 and continues to blocks 302 and 311. In block 302, an input is digitized. The input may be a carrier modulated with analog and/or digital data. If the carrier is a hybrid analog/digital FM audio carrier, the digitizing may be done in a way that minimizes phase noise of the OFDM carriers and the FM modulation. The digitizing may create complex samples such as quadrature and in-phase samples. At block 303, the digitized input is down-converted to remove the carrier. Any method may be used including decimation. The resultant baseband data is then filtered to reduce peaks at block 304. The filtering may be done without regard to the actual coding of the symbols of the modulation but may be dependent on the modulation technology being used. The coefficients used by the filter in block 304 may be determined at design time and may be chosen so that the filter doesn't adversely affect the modulation of the symbols.

At block 311, feedback from the RF amplifier output is digitized. The digitizing may create complex samples. The digitized feedback is down-converted to remove the carrier at block 312.

At block 321, pre-distortion coefficients are calculated based on the input and the feedback. The down-converted feedback may be delayed to account for any phase delay in the RF amplifier so that the down-converted feedback and the filtered input may be correlated. The down-converted and filtered input may be compared to the down-converted feedback and the pre-distortion coefficients calculated based on power level, prior signal strength, and/or other characteristics of the input and the feedback. The pre-distortion coefficients may account for memory effects of the RF power amplifier. The coefficients may be applied to filter the filtered down-converted input at block 322. Complex samples may be output by the filter at block 322.

The complex samples output by the filter at block 22 may be up-converted at block 323. The up-conversion may be to the original carrier frequency of the input or a different carrier frequency. The up-converted output may be converted to analog at block 324. In some embodiments the analog output may be coupled to a low-power low-noise amplifier to boost the level of the analog output to be suitable for use by the RF power amplifier. The low-power low-noise amplifier may also have an output impedance matched to the input impedance of the RF power amplifier, such as 50 ohms. The analog output may be provided to the RD power amplifier at block 325.

Unless otherwise indicated, all numbers expressing quantities of elements, optical characteristic properties, and so forth used in the specification and claims are to be understood as being modified in all instances by the term "about." The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. §112, ¶6. In particular the use of "step of" in the claims is not intended to invoke the provision of 35 U.S.C. §112, ¶6.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A method to compensate an input to a radio frequency amplifier, the method comprising: digitizing an analog radio frequency input; down-converting the digitized radio frequency input to create a down-converted input, wherein one or more processors are configured to down-convert the digitized radio frequency input to create the down-converted input; digitizing an analog feedback coupled to an output of the radio frequency amplifier; down-converting the digitized feedback to create a down-converted feedback, wherein the one or more processors are configured to down-convert the digitized feedback; calculating pre-distortion coefficients based on the down-converted input and down-converted feedback; filtering the down-converted input using the pre-distortion coefficients, wherein the one or more processors are configured to filter the down-converted input to reduce peaks; up-converting an output of the digital pre-distortion filter to a carrier frequency, wherein the one or more processors are configured to up-convert the output of the digital pre-distortion filter to said carrier frequency; converting to the up-converted output to an analog output; and providing the analog output to the radio frequency amplifier.

2. The method of claim 1, wherein the filtering to reduce peaks uses coefficients that do not adversely affect modulation of symbols in the down-converted input.

3. The method of claim 1, wherein the filtering to reduce peaks uses coefficients that are pre-determined based on an expected modulation technology.

4. The method of claim 1, wherein one or more of the digitized radio frequency input, the down-converted input, the digitized feedback, the down-converted feedback, the output of the pre-distortion filter, and the up-converted output comprise complex samples.

5. The method of claim 1, wherein the pre-distortion coefficients comprise complex coefficients.

6. The method of claim 1, wherein the filtering uses a Kaiser window filter.

7. The method of claim 1, wherein one or both of a carrier frequency of the analog radio frequency input and the carrier frequency of the analog output are in the very high frequency (VHF) band.

8. The method of claim 1, wherein one or both of a carrier frequency of the analog radio frequency input and the carrier frequency of the analog output have a center frequency in a range of 65 mega-hertz (MHz) to 110 MHz and the analog radio frequency input is frequency modulated (FM).

9. The method of claim 1, wherein one or both of a carrier frequency of the analog radio frequency input and the carrier frequency of the analog output have a center frequency in a range of about 86.5 mega-hertz (MHz) to 108 MHz and the analog radio frequency input carries digital data modulated using orthogonal frequency-division multiplexing (OFDM) or coded orthogonal frequency-division multiplexing (COFDM).

10. The method of claim 1, wherein the carrier frequency of the analog output has a center frequency in a range of 40 mega-hertz (MHz) to 1000 MHz and the analog radio frequency input carries digital data modulated using vestigial side-band (VSB) modulation or coded orthogonal frequency-division multiplexing (COFDM).

11. The method of claim 1, further comprising increasing a voltage level of an analog up-converted output to create the analog output and matching an impedance of the analog output with an input impedance of the radio frequency amplifier.

12. A compensation apparatus comprising: a first analog to digital converter to digitize an analog radio frequency input; a second analog to digital converter to digitize an analog feedback from an output of a radio frequency amplifier; one or more processors to calculate pre-distortion coefficients based on the input and the feedback, and apply a digital pre-distortion filter to the input using the pre-distortion coefficients; a digital to analog converter coupled between the one or more processors and the radio frequency amplifier; a first down-converter coupled between the first analog to digital converter and the one or more processors to create a down-converted input, wherein the one or more processors are configured as the first down-converter to down-convert the digitized radio frequency input to create the down-converted input; a second down-converter coupled between the second analog to digital converter and the one or more processors, wherein the one or more processors are configured as the second down-converter to down-convert digitized feedback; and an up-converter coupled between the one or more processors and the digital to analog converter, wherein the one or more processors are configured as the up-converter to up-convert an output of the digital pre-distortion filter to a carrier frequency; wherein the one or more processors are configured to filter the down-converted input to reduce peaks.

13. The apparatus of claim 12, wherein the first and second analog to digital converters output complex samples.

14. The apparatus of claim 12, wherein the pre-distortion coefficients comprise complex coefficients.

15. The apparatus of claim 12, wherein the sample rate of the first and second analog to digital converters and the digital to analog converters is at least 10 times a symbol rate of an expected modulation technology.

16. The apparatus of claim 12, further comprising:
a low-noise amplifier having an output impedance matching an input impedance of the radio frequency amplifier coupled between the digital to analog converter and the radio frequency amplifier.

17. The apparatus of claim 12, wherein the one or more processors include at least one digital signal processor.

\* \* \* \* \*